United States Patent
Cho (10) Patent No.: US 7,968,227 B2
(45) Date of Patent: Jun. 28, 2011

(54) CAN-TYPE RECHARGEABLE BATTERY HAVING CONNECTION STRUCTURE FOR PROTECTION CIRCUIT

(75) Inventor: Sung Jae Cho, Youngin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1243 days.

(21) Appl. No.: 11/280,286

(22) Filed: Nov. 17, 2005

(65) Prior Publication Data

US 2006/0127755 A1 Jun. 15, 2006

(30) Foreign Application Priority Data

Nov. 18, 2004 (KR) ........................ 10-2004-0094612

(51) Int. Cl.
*H01M 2/08* (2006.01)
*H01M 2/02* (2006.01)
*H01M 2/06* (2006.01)
*H01M 10/04* (2006.01)

(52) U.S. Cl. ................ 429/170; 429/7; 429/65; 429/92; 429/93; 429/94; 429/123; 429/151; 429/163

(58) Field of Classification Search .................... 429/65, 429/92–94, 122, 151, 163, 170
See application file for complete search history.

(56) References Cited

U.S. PATENT DOCUMENTS

| | | | | |
|---|---|---|---|---|
| 5,849,431 A * | 12/1998 | Kita et al. | | 429/164 |
| 5,912,092 A * | 6/1999 | Maruyama et al. | | 429/96 |
| 5,976,729 A * | 11/1999 | Morishita et al. | | 429/65 |
| 6,228,524 B1 * | 5/2001 | Kohler et al. | | 429/62 |
| 6,437,239 B1 * | 8/2002 | Zayatz | | 174/527 |
| 6,595,907 B1 * | 7/2003 | Ishikawa et al. | | 492/46 |
| 6,712,528 B2 * | 3/2004 | Galeotti et al. | | 385/91 |
| 2002/0006540 A1 * | 1/2002 | Enomoto et al. | | 429/53 |
| 2002/0006542 A1 * | 1/2002 | Park et al. | | 429/72 |
| 2003/0064283 A1 * | 4/2003 | Uemoto et al. | | 429/149 |
| 2003/0077486 A1 * | 4/2003 | Iwaizono et al. | | 429/7 |
| 2004/0126651 A1 | 7/2004 | Kim et al. | | |
| 2004/0126656 A1 * | 7/2004 | Cho | | 429/181 |
| 2004/0137322 A1 * | 7/2004 | Hong et al. | | 429/176 |
| 2004/0166414 A1 * | 8/2004 | Omaru et al. | | 429/231.4 |
| 2004/0191947 A1 * | 9/2004 | Komuro et al. | | 438/57 |
| 2004/0197642 A1 * | 10/2004 | Sato | | 429/158 |
| 2004/0211053 A1 * | 10/2004 | Trainer et al. | | 29/623.1 |
| 2004/0214076 A1 * | 10/2004 | Tsukamoto et al. | | 429/94 |

FOREIGN PATENT DOCUMENTS

| | | |
|---|---|---|
| JP | 09-330696 | 12/1997 |
| JP | 11-170069 | 6/1999 |
| JP | 2004-214181 | 7/2004 |
| JP | 2005-259388 | * 9/2005 |

OTHER PUBLICATIONS

Japanese Notice of Allowance of Japanese Patent Application No. 2005-333321 dated May 10, 2011.

* cited by examiner

*Primary Examiner* — Ula C Ruddock
*Assistant Examiner* — Amanda Barrow
(74) *Attorney, Agent, or Firm* — H.C. Park & Associates, PLC (57) ABSTRACT

A can-type rechargeable battery includes a connection portion for coupling a protection circuit to a can-type bare cell and a lead plate for coupling the connection portion to the can. At least one protrusion is disposed at a connection portion outside the can and a lead plate has a hole that is engaged with the protrusion.

19 Claims, 6 Drawing Sheets

CAN-TYPE RECHARGEABLE BATTERY HAVING CONNECTION STRUCTURE FOR PROTECTION CIRCUIT

CROSS REFERENCE TO RELATED APPLICATION

This application claims priority to and the benefit of Korean Patent Application No. 10-2004-0094612, filed on Nov. 18, 2004, in the Korean Intellectual Property Office, the disclosure of which is incorporated herein in its entirety by reference.

BACKGROUND OF THE INVENTION

1. Field of the Invention

The present invention relates to a rechargeable battery and its connection structure with a protection circuit.

2. Description of the Background

Recently, many types of rechargeable batteries that have a high power storage capacity have been developed. Examples of widely-used rechargeable batteries include nickel metal hydride (Ni-MH) batteries, lithium (Li) polymer batteries, and lithium ion (Li-ion) batteries.

A bare cell of a rechargeable battery is formed by preparing an electrode assembly with a positive electrode, a negative electrode, and a separator interposed between the electrodes. The electrode assembly is housed in a can made of aluminum or an aluminum alloy. The can is closed with a cap assembly. An electrolyte is injected into the can, and the cap assembly is sealed. Since the can comprises lightweight aluminum or an aluminum alloy, the resulting batteries may be lightweight and may be used without erosion at a high voltage for a long time. Typically, an electrode terminal is insulated from the cap assembly by a gasket that is provided to an upper portion of the bare cell. The electrode terminal is coupled with the positive electrode or the negative electrode of the electrode assembly to form a positive terminal or a negative terminal of the bare cell. The can has the opposite polarity to that of the electrode terminal.

The electrode terminal of the bare cell in the sealed rechargeable battery is coupled with terminals of safety devices such as a positive temperature coefficient (PTC) device, a thermal fuse, and a protection circuit module (PCM). These safety devices prevent destruction of the rechargeable battery by interrupting current flow in the event of a thermal runaway or an abnormal increase in voltage.

Typically, a conductor structure called a connection lead connects the safety device to the positive electrode or the negative electrode of the bare cell of the rechargeable battery. The connection lead may comprise nickel, a nickel alloy, or nickel-plated stainless steel.

The bare cell and the safety device that is coupled with the bare cell are enclosed by a hard case to form a hard battery pack.

Since the connection lead is made of nickel or the like, the connection lead may cause problems when it is welded to a lower surface of the can that is made of an aluminum alloy. More specifically, since nickel is infusible at a low temperature and is highly conductive, it is hard to weld nickel to aluminum using an ultrasonic or resistance welding process. Therefore, a laser welding process in which a laser beam is illuminated at contact point between the can and the connection lead is used so that the contact point can be partially fused. However, during laser welding, the illuminated laser beam and the associated electrical charging phenomenon may have an electrical impact on the protection circuit that is connected to an end portion of the connection lead. This may destroy the safety device deteriorate its performance, in turn harming the reliability of the rechargeable batteries.

To overcome the problem associated with the laser welding process, U.S. Pat. No. 5,976,729 discloses an approach in which a lead plate made of nickel is welded to a lower surface of a can made of nickel by laser welding. According to the approach, the lead plate that is coupled with the protection circuit is resistance-welded to the lower surface of the can.

Figure 1:
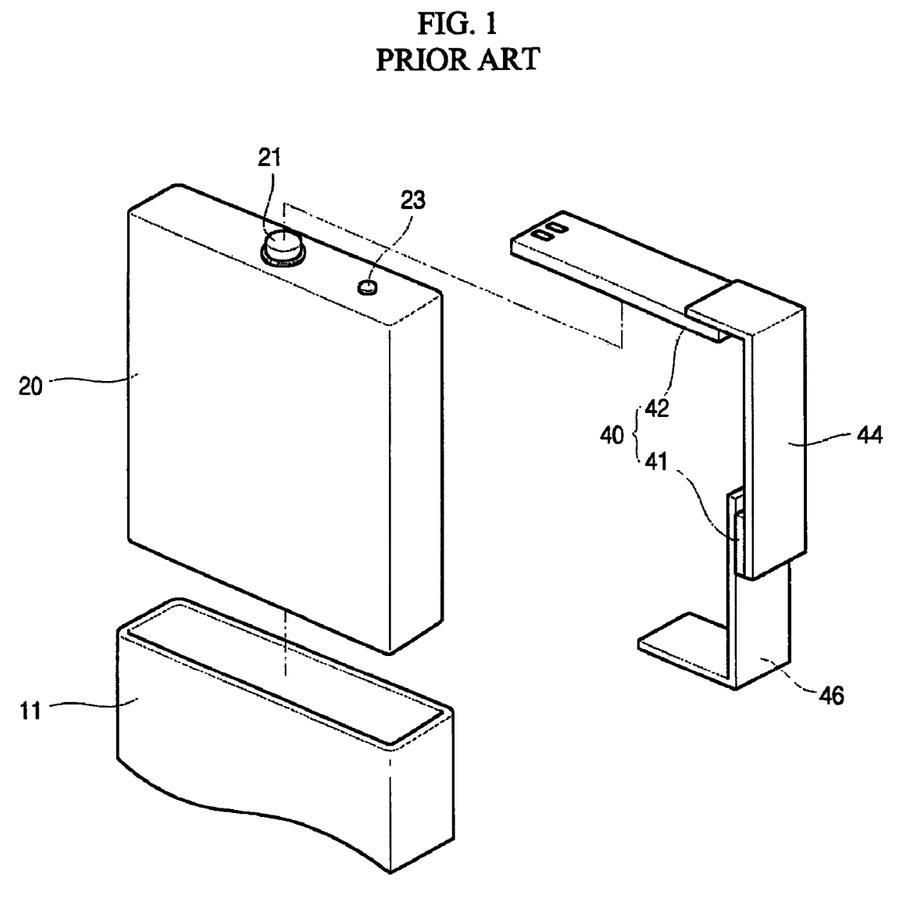
FIG. 1 is an exploded perspective view of arrangement of a hard case, a can, and a protection circuit of a conventional a can-type rechargeable battery.
Figure 2:
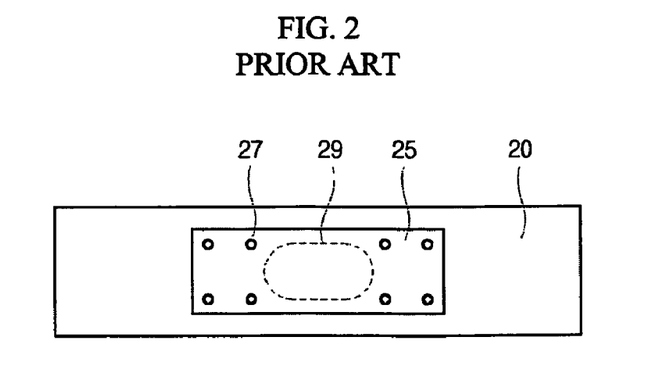
FIG. 2 is a bottom view of a lead plate welded to a connection portion of a lower surface of the can of the conventional can-type rechargeable battery.

FIG. 1 is an exploded perspective view of a conventional can-type rechargeable battery comprising a bare cell 20, a can 11, and a protection device 40 which include protection circuit 42 and PTC 41 (Positive Thermal Coefficient 41). The reference number 21 is an electrode terminal, 23 is an electrolyte injecting hole, and 44 and 46 are connection leads. FIG. 2 is a bottom view of a lead plate 25 welded to a connection portion of a lower portion 20 of the can 11 of the conventional can-type rechargeable battery.

A demand for a compact, lightweight, high-capacity battery requires, cans (containers) that have a large internal volume and a small size and thickness. Therefore, it is difficult to properly attach the lead plate 25 to the lower portion 20 of the can 11 by laser welding. More specifically, since the can is very thin, the welding intensity must be adjusted so that leakage of electrolyte from a laser-welded portion 27 can be prevented.

In addition, if there is a gap between the lead plate 25 and the lower portion 20 of the can 11 welded thereto, a hole may be generated on the lead plate 25 when the connection lead 46 is welded. If the lead plate is not welded to a predetermined portion, the connection lead 46 may be directly welded to the lower portion 20 of the can, so that the aforementioned conventional problems cannot be overcome.

In addition, if a safety vent 29 is provided to the lower portion 20 of the can, the safety vent 29 may suffer thermal impact during the laser welding process, causing damage to the seal of the bare cell. These problems eventually result in a lower production yield.

SUMMARY OF THE INVENTION

The present invention provides a can-type rechargeable battery and a method for manufacturing the same that prevents damage to a can during a process for coupling a connection lead to the can and prevents destruction of a safety device that is disposed near a connection portion.

The present invention also provides a can-type rechargeable battery and a method for manufacturing the same that couples a protection circuit to a can of a bare cell without causing an electrical impact on the protection circuit.

Additional features of the invention will be set forth in the description which follows, and in part will be apparent from the description, or may be learned by practice of the invention.

The present invention discloses a can-type rechargeable battery comprising a bare cell comprising an electrode assembly comprising two electrodes and a separator interposed between the two electrodes, a can for accommodating the electrode assembly and an electrolyte, and a cap assembly for closing an upper opening of the can. At least one protrusion is disposed at a connection portion outside the can, and a lead plate that has a hole engaged with the protrusion is coupled with the connection portion.

The present invention also provides a method for manufacturing a can-type rechargeable battery comprising preparing an electrode assembly having two electrodes and a separator that prevents a short-circuit between the two electrodes, housing the electrode assembly into a can through an opening in the can and closing the opening with a cap assembly. In addition, the method comprises forming a protrusion at a connection portion outside the can and attaching a lead plate having a hole engaged with the protrusion to the can.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 4B is performed.

DETAILED DESCRIPTION OF THE ILLUSTRATED EMBODIMENTS

The present invention prevents damage of a can and safety vent formed on a lower portion of the can and couples a protection circuit to the can without electrical impact. It achieves this by forming grooves and protrusions on the lower portion of the can.

According to the present invention, since the lead plate is coupled with the can without welding, damage to the lower surface of the can and perforation of the lead plate due to the welding process may be prevented. In addition, since protrusions and grooves of the can are easily formed, it is possible to fabricate a high-capacity battery that has a thick can.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

Figure 3:
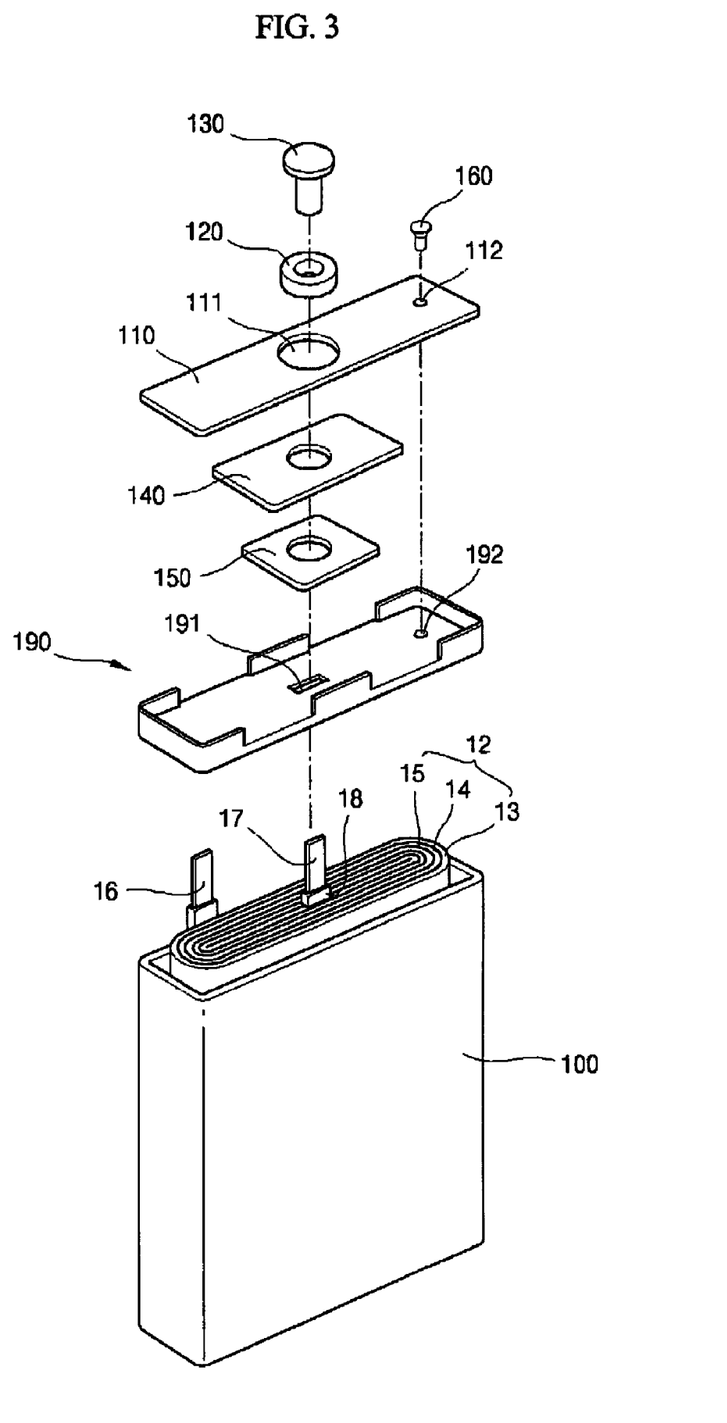
FIG. 3 is an exploded perspective view of a construction of a bare cell of a can type rechargeable battery according to an exemplary embodiment of the present invention.

FIG. 3 is an exploded perspective view of a bare cell of a can-type rechargeable battery according to an exemplary embodiment of the present invention.

Referring to FIG. 3, the can-type rechargeable battery comprises a can 100 that has substantially rectangular parallelepiped shape, an electrode assembly 12 accommodated in the can 100, and a cap assembly for closing an upper opening of the can 100. The can-type rechargeable battery includes a rectangular-can-type lithium ion rechargeable battery, for example.

The electrode assembly 12 is formed by winding a stack of a positive electrode plate 13 having a shape of a thin plate or film, a separator 14, and a negative electrode plate 15. Another separator may be provided on the outside of the negative electrode plate 15 to prevent a short-circuit between the positive electrode plate 13 and the negative electrode plate 15.

The positive electrode plate 13 comprises a positive current collector made of a conductive metal thin film such as an aluminum foil and a positive active material layer mainly comprising a lithium oxide. The positive active material layer is coated on both surfaces of the positive current collector. A positive tab 16 is coupled with a portion of the positive current collector where the positive active material layer is not provided.

The negative electrode plate 15 comprises a negative current collector made of a conductive metal thin film such as a copper foil and a negative active material layer mainly comprising carbon. The negative active material layer is coated on both surfaces of the negative current collector. A negative tab 17 is coupled with a portion of the negative current collector where the negative active material layer is not formed.

The positive tab 16 and negative tab 17 are wound by insulating tapes 18 to prevent a short circuit between the positive tab 16 and negative tab 17 and the positive electrode plate 13 and the negative electrode plate 15, respectively.

The separator 14 comprises polyethylene, polypropylene, or a co-polymer thereof The separator 14 is wider than the positive electrode plate 13 and negative electrode plate 15 to prevent a short circuit between the two electrode plates.

The can 100 may comprise aluminum or an aluminum alloy. The electrode assembly 12 is placed into the can 100 through the upper opening thereof. The can 100 houses the electrode assembly 12 and an electrolyte and serves as a terminal.

The cap assembly includes a cap plate 110 that has substantially the same size and shape as those of the upper opening of the can 100. A terminal hole 111 is provided at a central portion of the cap plate 110. An electrode terminal 130 passes through the terminal hole 111. A gasket 120 with a tube shape is disposed between the electrode terminal 130 and the cap plate 110 so that the electrode terminal 130 can be electrically insulated from the cap plate 110. The electrode terminal 130 is disposed to pass through a central portion of the cap plate 110.

An insulating plate 140 is disposed on a lower surface of the cap plate 110. A terminal plate 150 is disposed on a lower surface of the insulating plate 140. A lower side portion of the electrode terminal 130 is coupled with the terminal plate 150.

A positive tab 16 that extends from the positive electrode plate 13 is coupled with a lower surface of the cap plate 110. A lower end portion of the terminal plate 150 is welded to the negative tab 17 that extends from the negative electrode plate 15, which is wound.

An insulating case 190 covers the electrode assembly 12 to electrically insulate the electrode assembly 12 from the cap assembly. The insulating case 190 may comprise an insulating polymer resin such as polypropylene. A lead hole 191 through which the negative tab 17 passes is provided at a central portion of the insulating case 190. An electrolyte penetration hole 192 may be provided at a side portion of the insulating case 190. However, the electrolyte penetration hole 192 may not be provided.

An electrolyte injection hole 112 is provided at another side portion of the cap plate 110. After the electrolyte is injected, the electrolyte injection hole 112 is closed with a stopper 160. The stopper 160 is formed by pressing a ball-shaped material made of aluminum or an aluminum alloy into the electrolyte injection hole 112. Next, the stopper 160 and the electrolyte injection hole 112 of the cap plate 110 are sealed using a welding process. Next, the perimeter of the cap plate 110 and the upper opening of the can 100 are connected using the welding process.

Figure 4A:
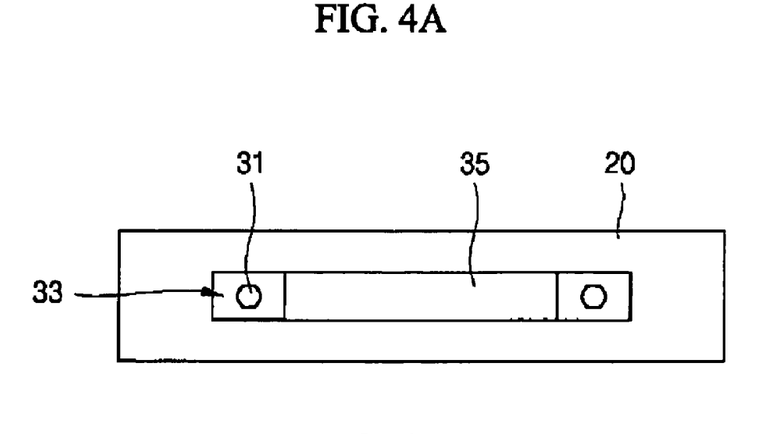
FIG. 4A is a bottom view of the can according to an exemplary embodiment of the present invention.
Figure 4B:
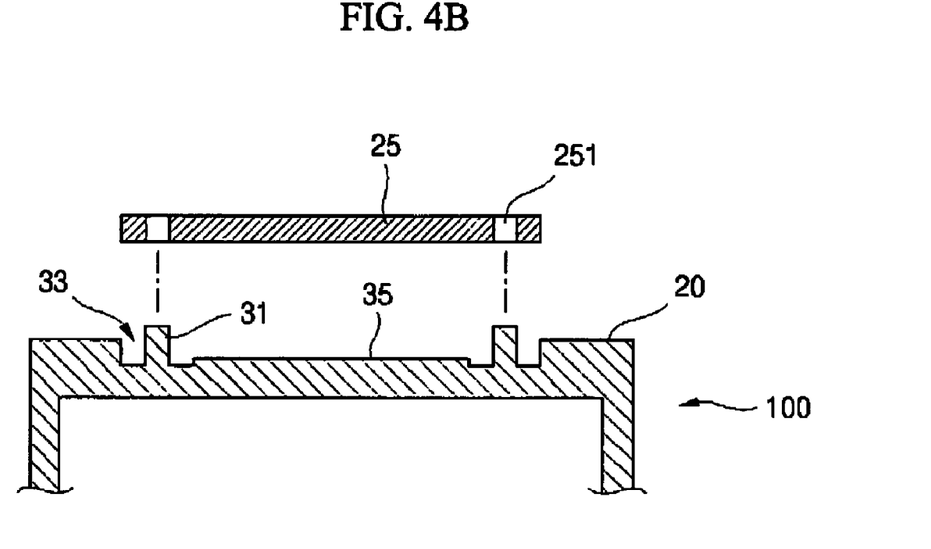
FIG. 4B is a cross-sectional view of the lead plate and the lower portion of the can.

FIG. 4A is a bottom view of the can 100 according to an exemplary embodiment of the present invention, and FIG. 4B is a cross-sectional view of the lead plate 25 and the lower portion 20 of the can 100.

Referring to FIG. 4A and FIG. 4B, rectangular grooves 33 are provided at sides of the lower surface of the can 100. However, the shapes of the grooves are not limited thereto. The protrusions 31 are provided at the central portions of the respective grooves 33. A step portion 35 is provided between the two grooves 33. The step portion 35 is higher than the bottom of the groove 33 and lower than the lower surface of the can 100. The step portion 35 is generally a portion of the groove.

The protrusions 31 may be formed in a deep drawing process for forming the can 100. Alternatively, the protrusions 31 may be formed by an additional process after the can 100 is formed that includes a pressing process in which the can 100 is inserted between inner and outer mold frames and then pressed.

In the present invention, the protrusion 31 is higher than the lower portion 20 of the can 100. The lower portion 20 of the can 100 is about 0.4 mm to about 0.8 mm thick, which is larger than the thickness of a side portion of the can 100, which is about 0.2 mm. The bottom of the groove 33 is lower than the lower portion 20 of the can 100 by about 0.1 mm to about 0.2 mm. The protrusion 31 is higher than the lower portion 20 of the can 100 by about 0.1 mm to about 0.2 mm.

By the formation of the groove 33, the protrusion 31 is further lengthened so that the lead plate 25 can be effectively attached to the lower portion of the can 100. In addition, since the lead plate 25 is inserted into the groove 33, the lead plate 25 may be more effectively attached to the lower portion 20 of the can 100 by a frictional force between the lead plate 25 and the groove 33. Moreover, since a portion of the lead plate 25 is inserted into the groove 33, a portion of the lead plate that protrudes from the bare cell is reduced to decrease the size of the whole battery.

In addition, since a portion of the protrusion that extends from the lead plate 25 is lengthened, the extended portion of the protrusion 31 may be pressed to form a rivet head, so that the lead plate 25 can more effectively be attached to the lower portion 20 of the can 100. Each side of the rectangular groove 33 is about 2.5 mm long, and each of the protrusions 31 has a diameter or width of about 1 mm. Holes 251 corresponding to the protrusion 31 are provided to the lead plate 25.

Figure 5A:
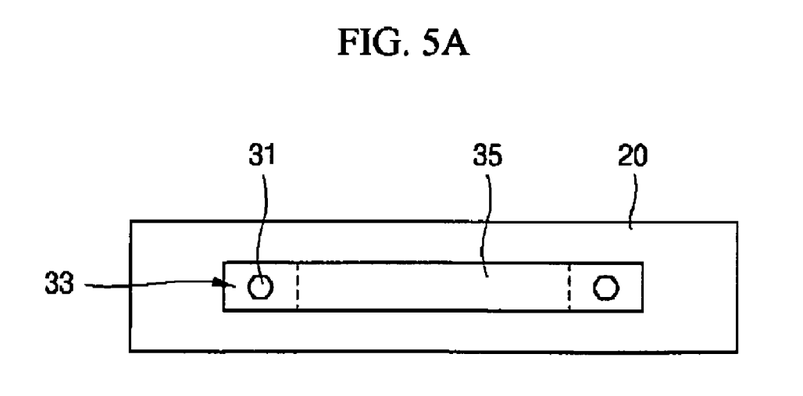
FIG. 5A and FIG. 5B are bottom and cross-sectional views of the lower portion of the can to which the lead plate is attached after the step of FIG. 4A
Figure 5B:
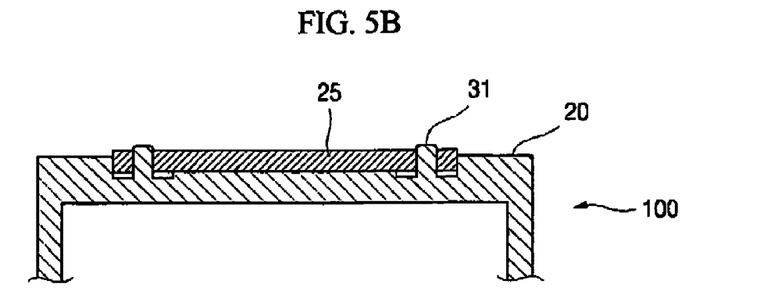

FIG. 5A and FIG. 5B are bottom and cross-sectional views, respectively, of the lower portion 20 of the can 100 to which the lead plate 25 having holes 251 corresponding to the protrusions 31 is coupled.

Referring to FIG. 5A and FIG. 5B, the lead plate 25 is coupled with the lower portion 20 of the can 100 by inserting the protrusions 33 of the lower portion 20 into the holes 251 of the lead plate 25. The lead plate 25 is inserted into the grooves 33 and the step portion 35 and fixed by inserting the protrusions 31 within the holes 251. In addition, by a rolling process using a roller (not shown), the lead plate is attached to the lower portion 20. Although the distal end of the protrusion 31 is shown not to be deformed in the figure, it may be largely deformed. For convenience of production, the process of coupling the lead plate 25 to the lower portion 20 is performed before any components are loaded in the can 100, that is, when preparing the can 100.

Figure 6:
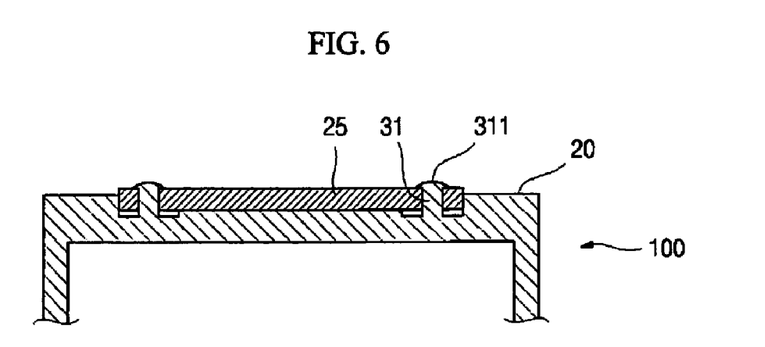
FIG. 6 is a cross-sectional view of the lower portion of the can to which the lead plate is attached after the step of FIG. 5B is performed.

The pressure on the lower portion 20 of the can 100 and the lead plate 25 may be controlled by adjusting the setting of the roller. As the pressure increases, the lead plate 25 is inserted into the grooves 33, and the step portion 35 of the lower portion 20 and the protrusions 31 are inserted into the holes 251 of the lead plate 25, so that the distal ends of the protrusions 31 that extend from the holes 251 may be plastically deformed to complete the rivet coupling, as shown in FIG. 6.

Alternately, the lead plate 25 may be coupled with the lower portion 20 of the can 100 as shown in FIG. 5B, and then, the distal ends of the protrusions 31 that extend from the holes 251 of the lead plate 25 are pressed to form a rivet head 331, so that more balanced rivet coupling can be completed.

Figure 7A:
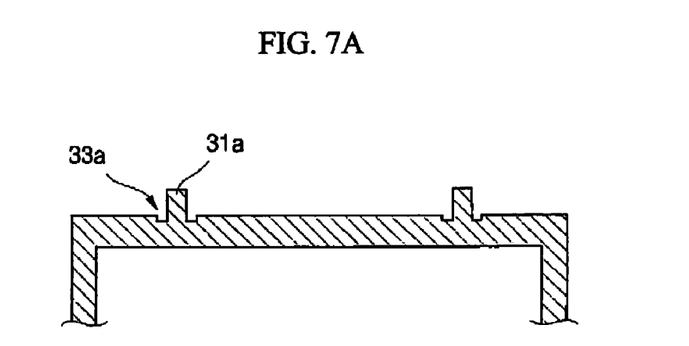
FIG. 7A and FIG. 7B are cross-sectional views of a lower portion of a can to explain a method of manufacturing a can-type rechargeable battery according to another exemplary embodiment of the present invention.
Figure 7B:
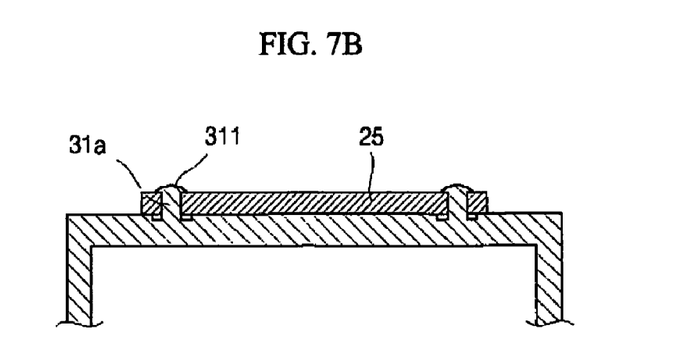

FIG. 7A and FIG. 7B are cross-sectional views of a lower portion of a can to explain a method for fabricating a can-type rechargeable battery according to another exemplary embodiment of the present invention.

Referring to FIG. 7A and FIG. 7B, protrusions 31a are provided in the lower portion 20 of the can 100. Grooves 33a are formed around the protrusion 31a. The depths of the groove 33a are smaller than those of the groove 33 of FIG. 5A and FIG. 5B. Furthermore, the groove 33a may not be provided. In the embodiment, it is difficult to increase the length of the protrusions 31a. In addition, the thickness of the bottom portion of the can 100 increases depending on the thickness of the lead plate 25. Therefore, this embodiment is suitable for a case where the bottom portion of the can 100 is not thick and the lead plate 25 has a relatively low thickness of about 0.05 mm to about 0.1 mm.

Figure 8A:
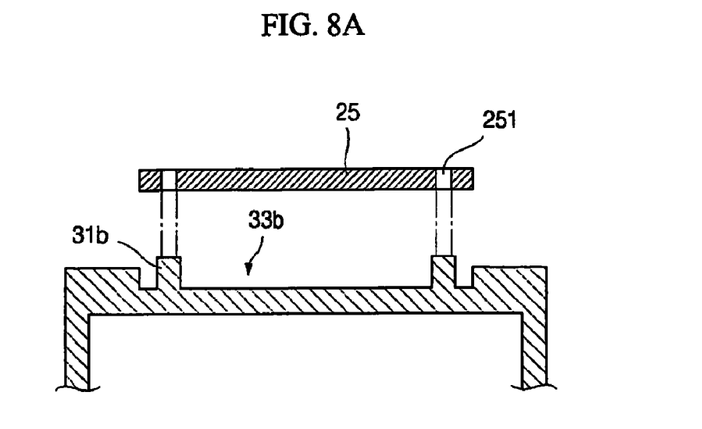
FIG. 8A and FIG. 8B are cross-sectional views of a lower portion of a can to explain a method of manufacturing a can-type rechargeable battery according to another exemplary embodiment of the present invention.
Figure 8B:
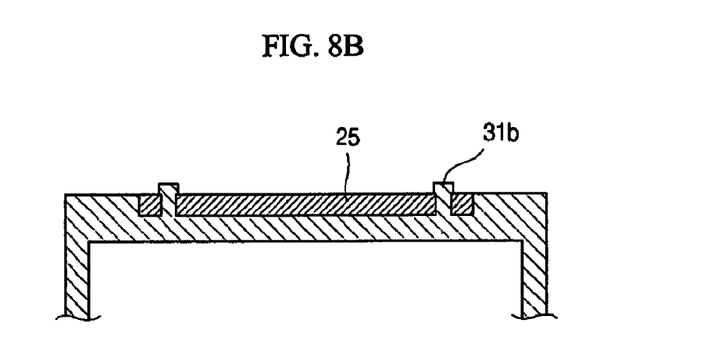

FIG. 8A and FIG. 8B are cross-sectional views of a lower portion of a can to explain a method for manufacturing a can-type rechargeable battery according to another exemplary embodiment of the present invention.

Referring to FIG. 8A and FIG. 8B, a groove 33b that has a depth corresponding to a thickness of the lead plate 25 is provided. The embodiment is suitable for a case where the lower portion of the can 20 is sufficiently thick and the lead plate 25 is sufficiently thin.

In addition, the diameter of the hole 251 is smaller than that of the protrusion 31b. The diameter of the protrusion 31b is larger than that of the hole 251 by about 0.01 mm to about 0.1 mm within an elastic limit of the protrusion 31b. When the lower portion 20 of the can 100 is thin, a protrusion 31b may be formed by a pressing process and the protrusion 31b may be is forcibly inserted into the hole 251 of the lead plate 25.

In the embodiment, since the protrusion 31b has a slightly larger size than the hole 251 of the lead plate 25, the lead plate 25 may be attached to the lower portion 20 of the can 100 even though the rivet head is not formed by the pressing process.

Figure 9:
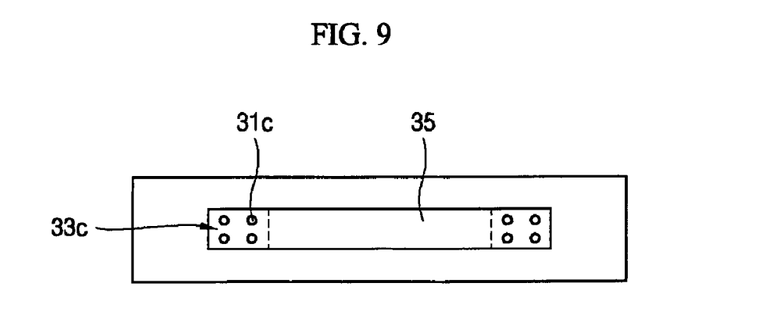
FIG. 9 and FIG. 10 are bottom views of a lower portion of a can according to another exemplary embodiment of the present invention.
Figure 10:
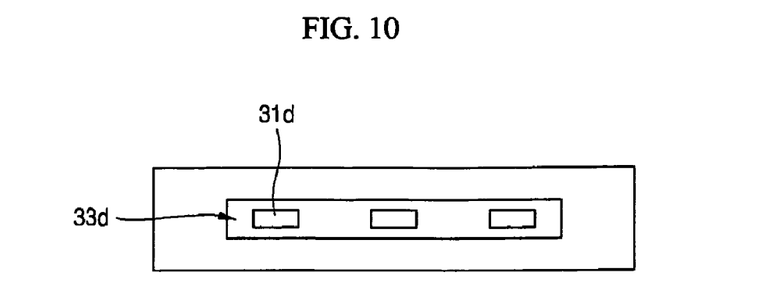

FIG. 9 and FIG. 10 are bottom views of a lower portion 20 of a can 100 according to another exemplary embodiment of the present invention.

Referring to FIG. 9, a plurality of protrusions 31 c may be provided near welding points between the lead plate 25 and the lower portion 20 of the can 100. The grooves 33c and a step portion 35 are similarly formed to that of FIG. 4A.

Referring to FIG. 10, three substantially rectangular protrusions 31d are provided, unlike in aforementioned embodiments where the protrusions are substantially circular. A groove 33d is formed to extend on a region corresponding to the step difference portion 35 of FIG. 4A.

The present invention is not limited to the aforementioned embodiment. The number of protrusions may be selected depending on the size of the lead plate. In addition, the shape of the protrusions may vary. If the contact area between the lead plate and the protrusions increase, the lead plate may be more firmly coupled with the lower surface 20 of the can 100.

Figure 11:
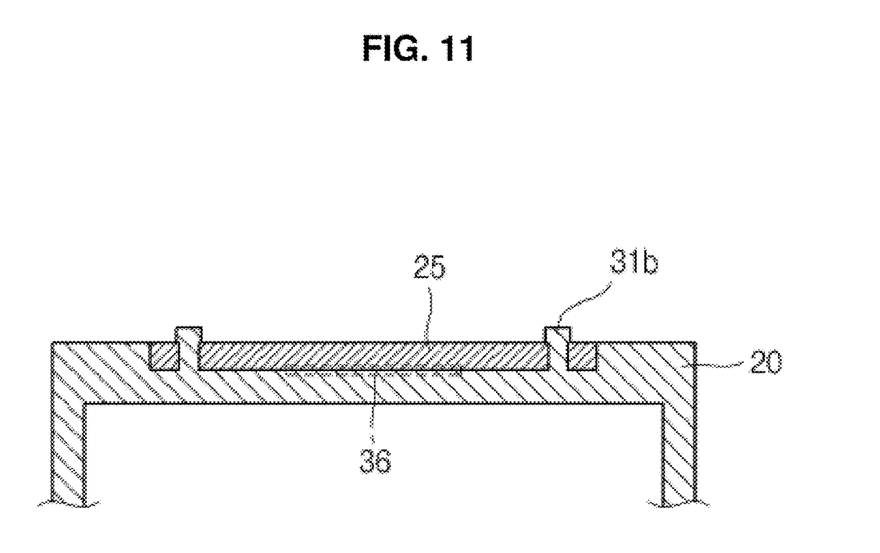
FIG. 11 is a cross-sectional view of the lead plate and the lower portion of the can according to another exemplary embodiment of the present invention.

Referring to FIG. 11, in order to more firmly attach the lead plate to the lower surface, an additional welding process 36 may be performed at the interface between the lead plate 25 and the lower portion 20 of the can 100.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A can-type rechargeable battery having a bare cell, comprising:
   an electrode assembly having two electrodes and a separator interposed between the two electrodes;
   a can accommodating the electrode assembly and an electrolyte, the can comprising an opening at a first end of the can configured to receive the electrode assembly through the opening and a bottom surface integrally formed at a second end of the can opposite the first end so as to entirely close the second end of the can; and
   a cap assembly arranged at the first end of the can and closing the opening of the can,
   wherein a protrusion integrally formed as part of the can is disposed at a connection portion on an outside of the bottom surface of the can,
   wherein a lead plate has a hole that is engaged with the protrusion,
   wherein the can is arranged between the cap assembly and the protrusion, and wherein an inside of the bottom surface of the can is a continuous planar surface.

2. The can-type rechargeable battery of claim 1,
   wherein at least a portion of the lead plate is inserted into a groove that is disposed at the connection portion.

3. The can-type rechargeable battery of claim 2, wherein the lead plate is inserted into the groove using a rolling process.

4. The can-type rechargeable battery of claim 2,
   wherein the groove has a step portion.

5. The can-type rechargeable battery of claim 2,
   wherein the protrusion is disposed at a central portion of the groove.

6. The can-type rechargeable battery of claim 1,
   wherein the lead plate is coupled with a protection circuit by a connection lead that is disposed outside the bare cell, and
   wherein the lead plate and the connection lead are coupled with each other by a resistance welding process.

7. The can-type rechargeable battery of claim 6,
   wherein the connection lead and the lead plate comprise a nickel or a nickel alloy, and
   wherein the lead plate is about 0.05 mm to about 0.2 mm thick.

8. The can-type rechargeable battery of claim 1,
   wherein the protrusion is formed by an injection molding process to have a distal end that is larger than the hole.

9. The can-type rechargeable battery of claim 1,
   wherein a distal end of the protrusion is a rivet head.

10. The can-type rechargeable battery of claim 1,
    wherein a distal end of the protrusion is larger than the hole of the lead plate.

11. The can-type rechargeable battery of claim 1,
    wherein an auxiliary welding portion is provided between the lead plate and the can.

12. The can-type rechargeable battery of claim 2,
    wherein a height of the protrusion is greater than a thickness of the groove.

13. The can-type rechargeable battery of claim 2,
    wherein the groove is disposed on an outer bottom surface of the can.

14. The can-type rechargeable battery of claim 4,
    wherein protrusion is arranged between an edge of the groove and the step portion.

15. The can-type rechargeable battery of claim 4,
    wherein a thickness of the groove is greater than a thickness of the step portion.

16. The can-type rechargeable battery of claim 2,
    wherein the lead plate is spaced apart from a surface of the groove.

17. The can-type rechargeable battery of claim 1,
    wherein a width of the lead plate is greater than a width of a groove surrounding the protrusion.

18. The can-type rechargeable battery of claim 2,
    wherein a thickness of the lead plate is the same as a thickness of a groove.

19. The can-type rechargeable battery of claim 2,
    wherein a width of the lead plate is the same as a width of the groove.

* * * * *